United States Patent
Chiang et al.

(10) Patent No.: US 9,258,436 B2
(45) Date of Patent: Feb. 9, 2016

(54) METHOD OF EASILY CONFIGURING A NETWORK CAMERA

(71) Applicant: ArcSoft (Hangzhou) Multimedia Technology Co., Ltd., Hangzhou, Zhejiang Province (CN)

(72) Inventors: Wen-Hsiang Chiang, Hangzhou (CN); Shuai-Bin Chen, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 15 days.

(21) Appl. No.: 13/855,737

(22) Filed: Apr. 3, 2013

(65) Prior Publication Data

US 2014/0300764 A1    Oct. 9, 2014

(51) Int. Cl.
*H04N 1/00* (2006.01)
*H04N 7/18* (2006.01)

(52) U.S. Cl.
CPC ....... *H04N 1/00204* (2013.01); *H04N 1/00209* (2013.01); *H04N 7/183* (2013.01); *H04N 2201/0015* (2013.01)

(58) Field of Classification Search
CPC ........................... H04N 5/232; H04N 5/23203
USPC .......................................... 348/207.11, 207.1
See application file for complete search history.

(56) References Cited

U.S. PATENT DOCUMENTS

| | | | |
|---|---|---|---|
| 2001/0030695 A1* | 10/2001 | Prabhu et al. ................. | 348/232 |
| 2004/0046868 A1* | 3/2004 | Anderson et al. ......... | 348/207.11 |
| 2004/0196828 A1* | 10/2004 | Wells et al. ................... | 370/352 |
| 2008/0180524 A1* | 7/2008 | Lin et al. ........................ | 348/143 |
| 2008/0279164 A1* | 11/2008 | Wu et al. ....................... | 370/338 |
| 2009/0086029 A1* | 4/2009 | Wei et al. .................... | 348/207.1 |
| 2012/0290689 A1* | 11/2012 | Beguelin et al. .............. | 709/220 |

\* cited by examiner

*Primary Examiner* — Roberto Velez
*Assistant Examiner* — Stephen Coleman
(74) *Attorney, Agent, or Firm* — Winston Hsu; Scott Margo

(57) ABSTRACT

A method of setting up a network camera to communicate with a network includes connecting a cable to both the network camera and a computing device, the computing device being in communication with the network. The method also includes transmitting network configuration data from the computing device to the network camera via the cable, and adjusting network settings of the network camera according to the received network configuration data.

12 Claims, 6 Drawing Sheets

METHOD OF EASILY CONFIGURING A NETWORK CAMERA

BACKGROUND OF THE INVENTION

1. Field of the Invention

The invention relates to a method of configuring a network camera to work with a local area network, and more particularly to a method of configuring the network camera by transmitting network configuration data from a computing device to the network camera via a cable connected between the computing device and the network camera.

2. Description of the Prior Art

Network cameras are becoming more and more popular due to advantages like utilizing existing internet protocol (IP) infrastructure, being highly scalable in the number of network cameras that can be used, enjoying flexible camera placement, and supporting remote viewing from anywhere and anytime via standard web browsers, mobile devices, etc.

There are currently many network cameras on the market, and many of them are similar in how they operate. Aside from hardware differences among the network cameras on the market, one of the biggest differences is the user experience. For the typical user, properly setting up and connecting a network camera to an existing network such as a local area network is a serious burden for the user, and a large learning curve is often needed to complete setup.

Currently, the normal setup steps include: the user accessing the network camera via a wired or wireless connection, and connecting to a router or access point; configuring a proper static or Dynamic Host Configuration Protocol (DHCP) IP address for the network camera; setting up the proper communication mode, time, date, video, and audio configurations; and programming the service set identifier (SSID) and security key for a wireless network that the network camera will be connected to. Furthermore, depending on the specifics of the setup software for the network camera, additional setup data may be needed such as the network camera's name, necessary Hypertext Transfer Protocol (HTTP) information, sub-net mask data, gateway data, main Domain Name System (DNS) server data, backup DNS server data, etc.

Generally, all network camera manufacturers try to make this configuration process easier, and there are several solutions commonly employed. First of all, some manufacturers write software applications to provide a full configuration table for users to fill in. This configuration table is used to configure the network camera. Second, some manufacturers generate a barcode from the network configuration, and have the network camera scan and interpret the barcode for configuring the network camera. Third, some manufacturers may require the user to connect the network camera to a personal computer for configuring the network camera. Fourth, some manufacturers may involve ad-hoc wireless connections for configuring wireless settings.

Despite the variety of different methods employed for helping users to configure network cameras, the process still suffers from overly complicated procedures that are difficult for users to deal with when setting up a network camera.

SUMMARY OF THE INVENTION

It is therefore one of the primary objectives of the claimed invention to provide an improved method for helping users to set up network cameras through a simple and streamlined procedure.

According to an exemplary embodiment of the claimed invention, a method of setting up a network camera to communicate with a network is disclosed. The method includes connecting a cable to both the network camera and a computing device, the computing device being in communication with the network. The method also includes transmitting network configuration data from the computing device to the network camera via the cable, and adjusting network settings of the network camera according to the received network configuration data.

According to another exemplary embodiment of the claimed invention, a method of setting up a network camera to communicate with a network is disclosed. The method includes launching an application program (app) on a computing device, requesting, through the app, assistance with setting up the network camera, and prompting, with the app, a user to connect the network camera to the computing device with a cable. The method also includes connecting the cable to both the network camera and a computing device, the computing device being in communication with the network, and upon determining the cable is connected to both the network camera and the computing device, prompting, with the app, the user to enter a password for the network. The method further includes retrieving the network configuration data with the app after the user enters the password for the network, transmitting the network configuration data from the app to the network camera via the cable, and adjusting network settings of the network camera according to the received network configuration data.

These and other objectives of the present invention will no doubt become obvious to those of ordinary skill in the art after reading the following detailed description of the preferred embodiment that is illustrated in the various figures and drawings.

DETAILED DESCRIPTION

The present invention provides an easy method of helping users quickly set up network cameras. The method involves using a cable such as a Universal Serial Bus (USB) cable to connect a network camera to a computing device for transferring network configuration data from the computing device to the network camera.

Figure 1:
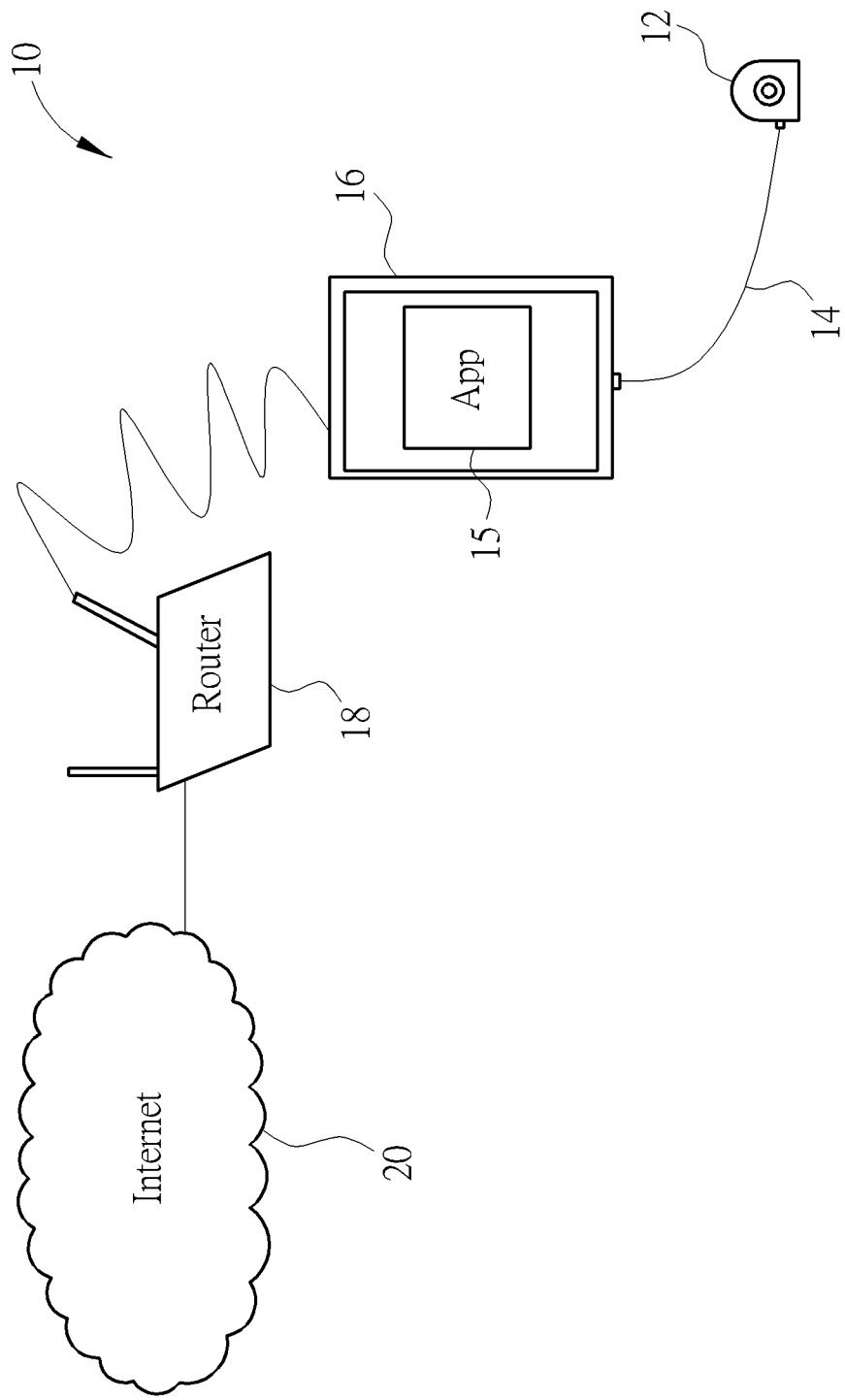
FIG. 1 is a diagram illustrating a local area network in which a network camera is to be installed according to the present invention.

Please refer to FIG. 1. FIG. 1 is a diagram illustrating a local area network 10 in which a network camera 12 is to be installed according to the present invention. The local area network 10 contains a router 18 for sharing a connection to the Internet 20 among the devices contained in the local area network 10. In this example, a computing device 16 is in wireless communication with the router 18. The computing device 16 can be a mobile phone, a tablet computer, a notebook computer, a desktop computer, or any similar such computing device 16 that is capable of connecting to the local area network 10. Furthermore, the computing device 16 can connect to the router 18 through either a wired network connection using a network cable or through a wireless internet connection, as depicted in FIG. 1.

To avoid the conventional difficulties experienced in setting up prior art network cameras, the present invention makes use of a USB cable 14 and an application program (app) 15 installed on the computing device 16 for transferring network configuration data from the app 15 to the network camera 12 for setting up the network camera 12. It should be known that any kind of USB cable 14 can be used, including any type of female or mail USB connectors. In addition, other cable standards can also be used such as IEEE 1394 standards. The present invention is not limited in the type computing device 16 used or the type of cable that is used to connect the computing device 16 to the network camera 12.

The app 15 can be a mobile app if the computing device 16 is a mobile phone or a tablet computer, or can be a conventional computer program if the computing device 16 is a notebook computer or a desktop computer. In either case, the computing device 16 should be able to connect to the local area network 10. The purpose of the app 15 is to obtain all of the necessary network configuration data and transmit this data to the network camera 12 via the USB cable 14. The network camera 12 then uses this network configuration data to complete setup of the network camera 12.

By using the USB cable 14 to transfer the network configuration data from the app 15 to the network camera 12, the user of the network camera 12 is able to avoid complicated setup procedures that usually plague new installations of the network camera 12. The user does not need to scan any barcodes with the network camera 12 or use any complicated ad-hoc wireless connections for configuring the wireless settings. Instead, the app 15 is programmed to handle all of the responsibility of obtaining the necessary network configuration data that is needed to setup the network camera 12.

Figure 2:
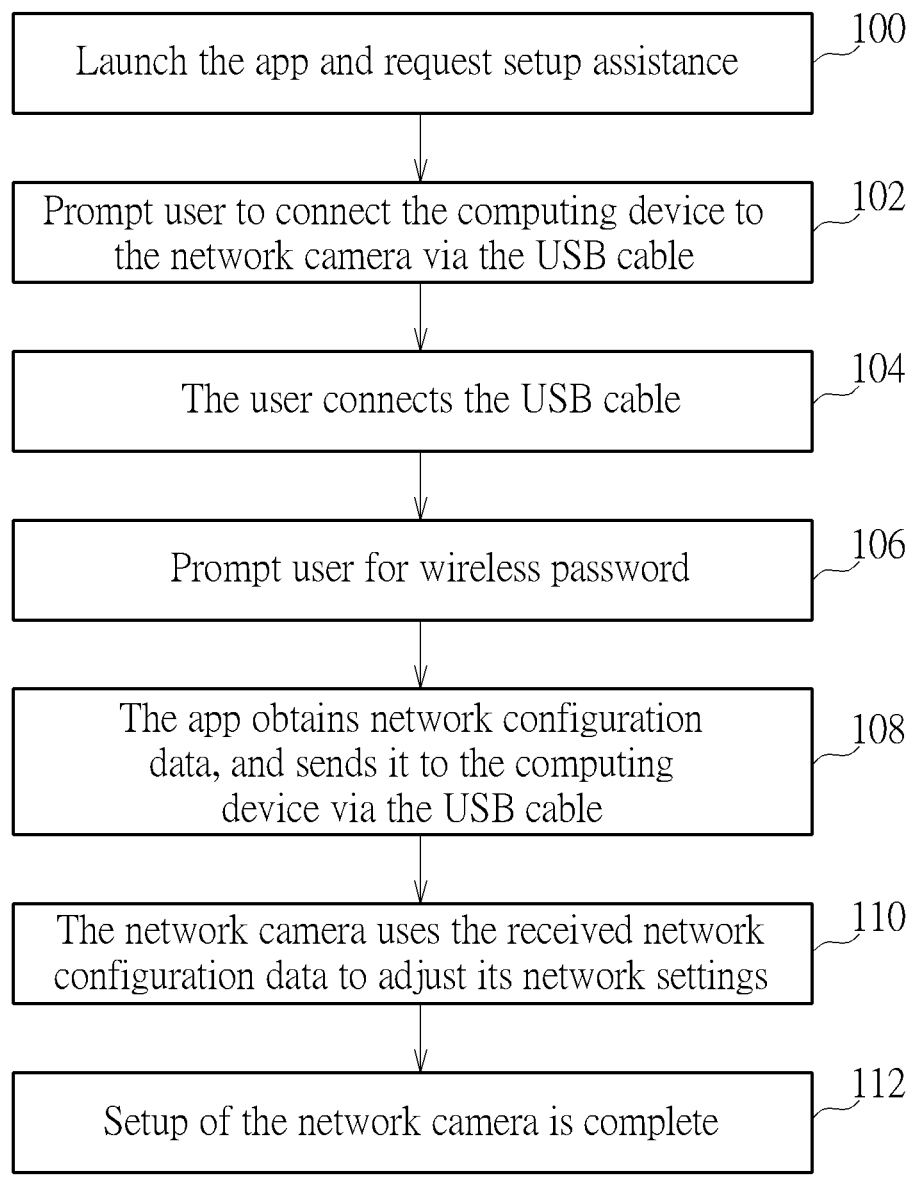
FIG. 2 is a flowchart describing the method of configuring the network camera according to the present invention.

Please refer to FIGS. 2 to 6. FIG. 2 is a flowchart describing the method of configuring the network camera 12 according to the present invention. FIGS. 3 to 6 illustrate setup screenshots shown in the app 15 during the process of setting up the network camera 12. Steps in the flowchart will be explained as follows.

Step 100: When the user wishes to set up a network camera 12, the user first launches the app 15 on the computing device 16. The user then indicates in the app 15 that the user wishes to receive assistance in adding the network camera 12 to the local area network 10.

Figure 3:
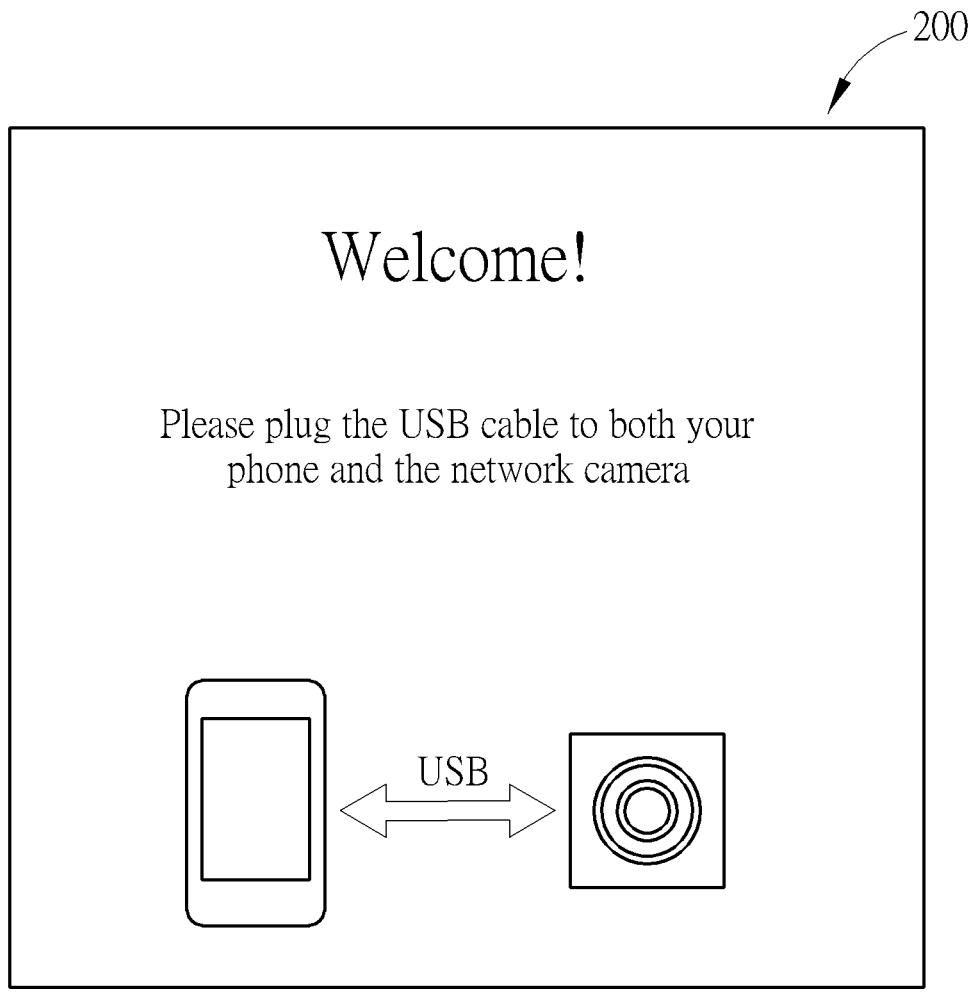
FIG. 3 illustrates a setup screenshot shown in the app during the process of setting up the network camera.

Step 102: The app 15 prompts the user to connect the computing device 16 to the network camera 12 via the USB cable 14. A screenshot 200 of this is shown in FIG. 3, where the user is instructed to connect the USB cable 14.

Figure 4:
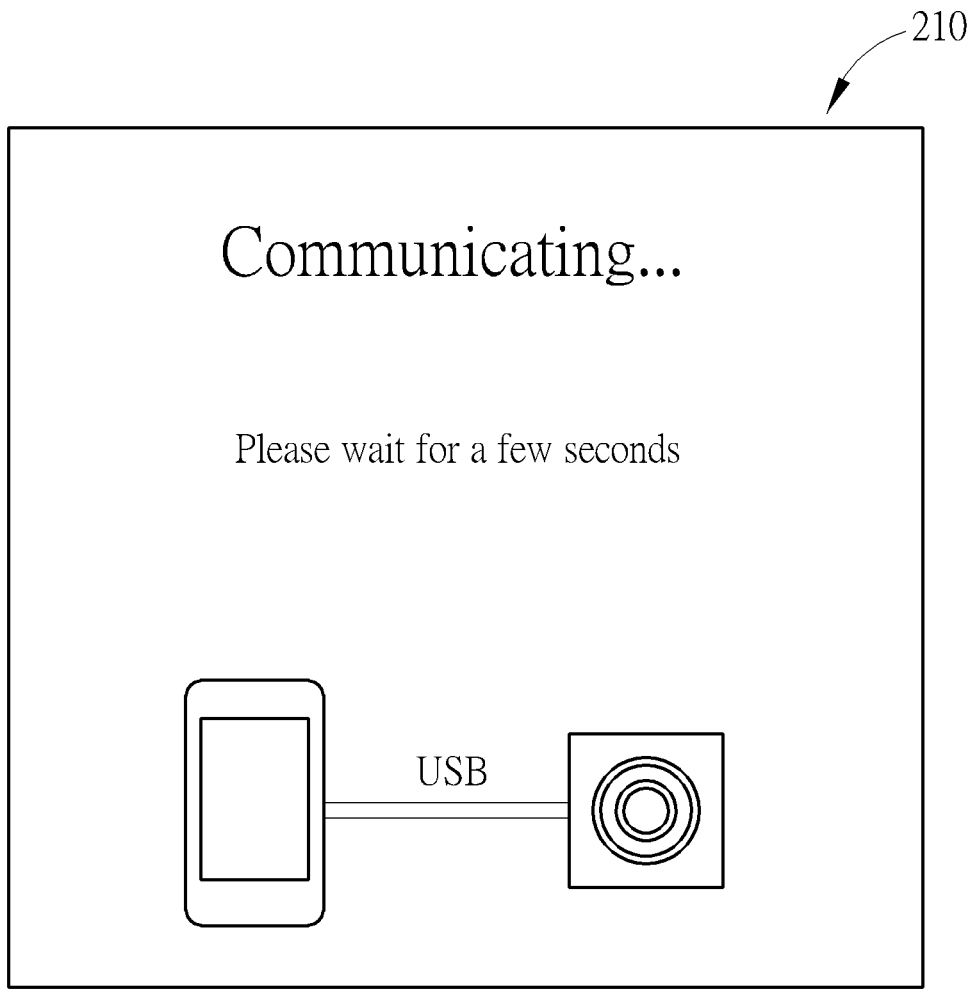
FIG. 4 illustrates a setup screenshot shown in the app during the process of setting up the network camera.

Step 104: Following the instructions in the app 15, the user connects the USB cable 14 to both the network camera 12 and the computing device 16, and the computing device 16 begins communicating with the network camera 12. A screenshot 210 of this is shown in FIG. 4, where the user is shown that the computing device 16 and the network camera 12 are communicating.

Figure 5:
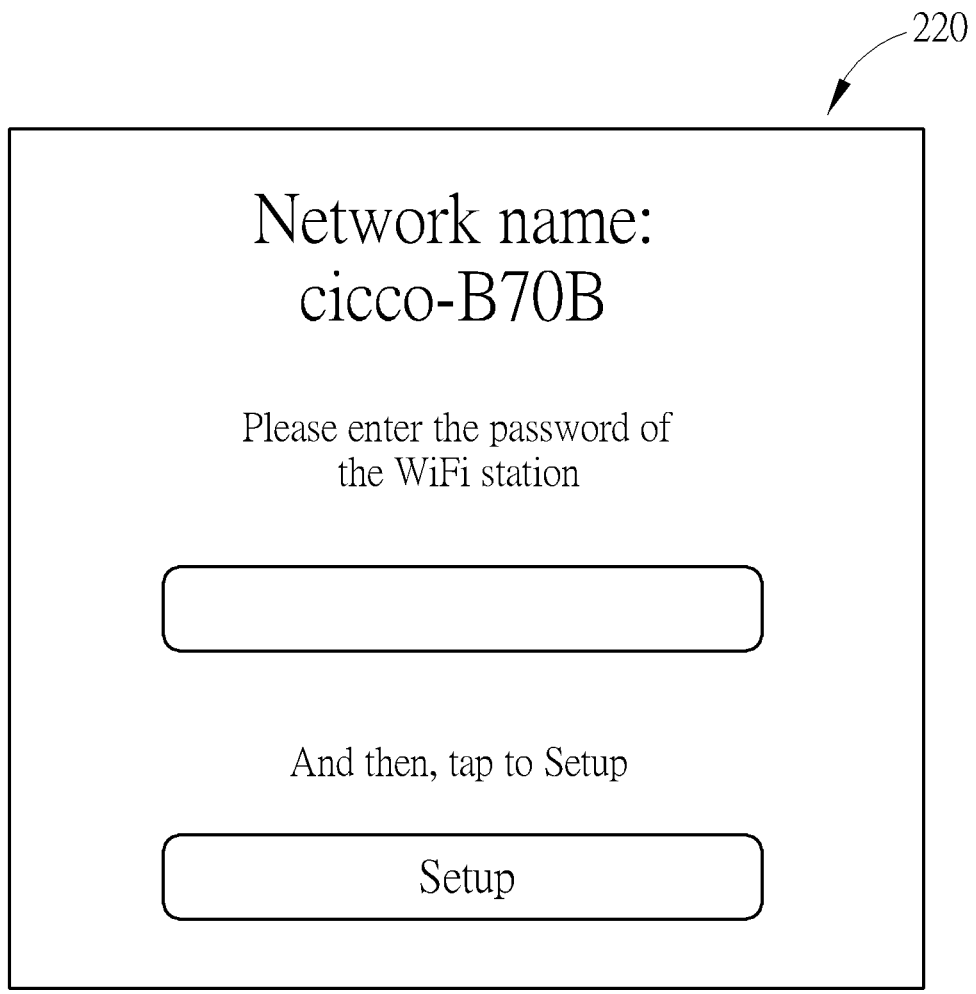
FIG. 5 illustrates a setup screenshot shown in the app during the process of setting up the network camera.

Step 106: Once the app 15 determines that the USB cable 14 is connected to the computing device 16 and the network camera 12, the app 15 prompts the user to enter a password for a located SSID so that the app 15 can obtain wireless network settings that the app 15 can transmit to the network camera 12. Before the user is prompted to enter the password, the app 15 automatically detects SSID associated with the corresponding Wi-Fi access point or router, and displays this SSID on the app 15 for the user to see. In this way, the user does not need to select the SSID for the corresponding access point or router, and the user can simply enter the password directly. A screenshot 220 of this is shown in FIG. 5, where the user is instructed to enter the password for the located SSID. The user then enters the password.

Step 108: The app 15 retrieves the network configuration data after the user enters the password for the located SSID. This network configuration data is then transmitted from the app 15 executed on the computing device 16 to the network camera 12 via the USB cable 14.

Step 110: The network camera 12 uses the received network configuration data to adjust the network settings of the network camera 12.

Figure 6:
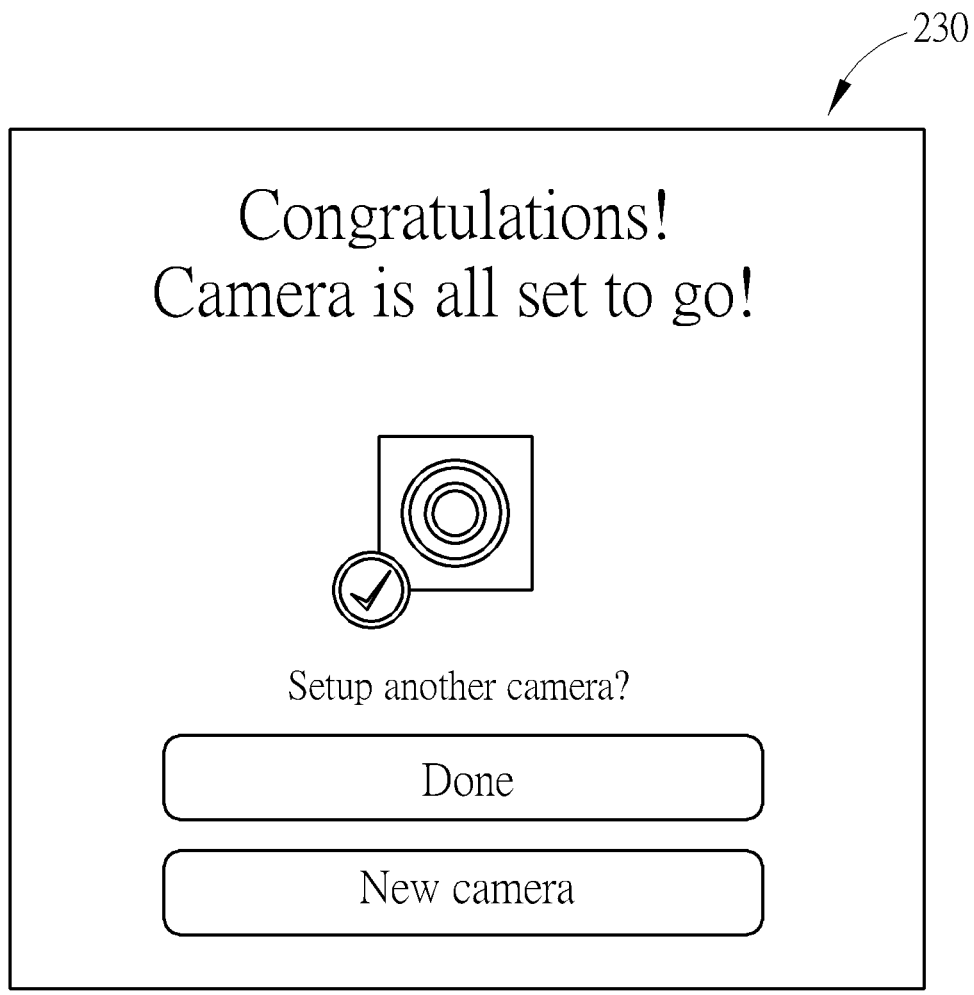
FIG. 6 illustrates a setup screenshot shown in the app during the process of setting up the network camera.

Step 112: Setup of the network camera 12 is complete. A screenshot 230 of this is shown in FIG. 6, where the app 15 indicates that setup is complete. The app 15 may ask if the user wishes to setup another new network camera 12, or if the user is done with setup.

If the user wishes to set up another network camera 12, the process will perform the steps shown in FIG. 2 again. However, the setup process for the additional new cameras will not need to perform step 106 since the app 15 will remember the password for the SSID.

The network camera 12 can be connected to the local area network 10 via a wired connection or a wireless connection such as a regular Wi-Fi connection, a Wi-Fi Protected Setup (WPS) connection, or an ad-hoc wireless connection. If a wired connection is used, the network camera 12 can be connected to the router 18 using a conventional network cable, also known as an Ethernet cable. If a wired connection is to be used, and a wireless connection is not available, then the computing device 16 can be connected to a wired network cable, and the user will not need to input the password for the SSID in step 106. After the setup process for the network camera 12 is finished, the app 15 can then prompt the user to plug a network cable into the network camera 12 for connecting the network camera 12 to the local area network 10.

Once the network camera 12 has been set up, the app 15 can prompt the user to disconnect the USB cable 14 from the network camera 12, and the network camera 12 does not need to be connected to the computing device 16 any longer. The network camera 12 can connect to the local area network 10 directly via either a wired or wireless connection to the router 18.

In summary, the app 15 obtains the network configuration data for the user and conveniently passes the network configuration data to the network camera 12 via the USB cable 14. The user is thus spared from having to endure complicated setup procedures when installing the new network camera 12. The app 15 can run on any kind of computing device 16, and run in any kind of operating system. The use of the app 15 and the USB cable 14 greatly simplifies the setup process of the network camera 12, and makes the setup process easy enough for virtually every user to handle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of setting up a network camera to communicate with a network, the method comprising:
    launching an application program (app) that is installed on a computing device;

requesting, through the app, assistance with setting up the network camera;

prompting, with the app, a user to connect the network camera to the computing device with a cable in response to requesting assistance with setting up the network camera;

connecting the cable to both the network camera and the computing device in response to prompting the user to connect the network camera to the computing device with a cable, the computing device being in communication with the network;

upon determining the cable is connected to both the network camera and the computing device, retrieving the network configuration data with the app and transmitting the network configuration data from the app to the network camera via the cable;

adjusting network settings of the network camera according to the received network configuration data;

after adjusting the network settings of the network camera according to the received network configuration data, prompting with the app, the user to connect the network camera to a network cable to connect the network camera to the network; and the network camera communicating with the network through the network cable after the user connects the network camera to a network cable.

2. The method of claim 1, further comprising:

after transmitting the network configuration data from the app to the network camera via the cable, prompting, with the app, the user to disconnect the cable.

3. The method of claim 1, wherein the network is a wireless network and the method further comprises:

before retrieving the network configuration data, prompting, with the app, the user to enter a password for the wireless network; and after adjusting the network settings of the network camera according to the received network configuration data, the network camera communicating with the network through the wireless network.

4. The method of claim 1, further comprising:

after adjusting the network settings of the network camera according to the received network configuration data, indicating, with the app, that the network camera has been properly configured.

5. The method of claim 1, wherein the cable is a Universal Serial Bus (USB) cable.

6. The method of claim 1, wherein the computing device is a mobile phone, a tablet computer, a notebook computer, or a desktop computer.

7. A method of setting up a network camera to communicate with a network, the method comprising:

launching an application program (app) on a computing device;

requesting, through the app, assistance with setting up the network camera;

prompting, with the app, a user to connect the network camera to the computing device with a cable in response to requesting assistance with setting up the network camera;

connecting the cable to both the network camera and a computing device in response to prompting the user to connect the network camera to the computing device with a cable, the computing device being in communication with the network;

upon determining the cable is connected to both the network camera and the computing device, prompting, with the app, the user to enter a password for the network;

retrieving the network configuration data with the app after the user enters the password for the network;

transmitting the network configuration data from the app to the network camera via the cable in response to retrieving the network configuration data with the app; and adjusting network settings of the network camera according to the received network configuration data.

8. The method of claim 7, further comprising:

after transmitting the network configuration data from the app to the network camera via the cable, prompting, with the app, the user to disconnect the cable.

9. The method of claim 7, further comprising:

after adjusting network settings of the network camera according to the received network configuration data, the network camera communicating with the network through the network.

10. The method of claim 7, further comprising:

after adjusting the network settings of the network camera according to the received network configuration data, indicating, with the app, that the network camera has been properly configured.

11. The method of claim 7, wherein the cable is a Universal Serial Bus (USB) cable.

12. The method of claim 7, wherein the computing device is a mobile phone, a tablet computer, a notebook computer, or a desktop computer.

* * * * *